Patented Jan. 30, 1945

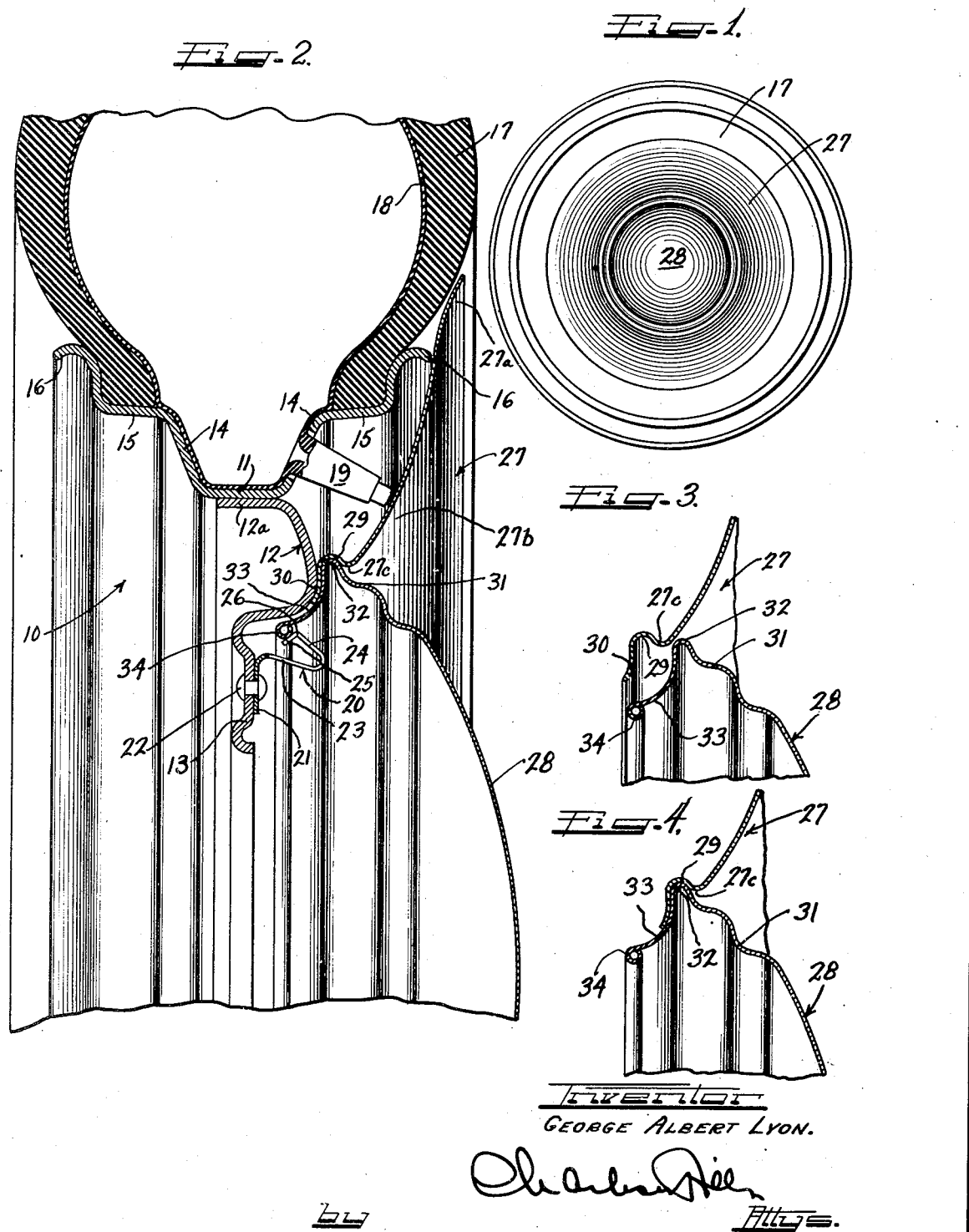

2,368,251

UNITED STATES PATENT OFFICE 2,368,251

WHEEL STRUCTURE

George Albert Lyon, Allenhurst, N. J.

Application July 31, 1943, Serial No. 496,892

3 Claims. (Cl. 301—37)

This invention is directed to improved wheel structures and more particularly to an improved cover assembly therefor.

It is an important object of the invention to provide a wheel structure and particularly an improved multi-part cover assembly therefor in which the various cover parts may be secured together and yet are so constructed and arranged that the completed assembly is protected against the development of vibration and thus rattling during operation of the vehicle with which it is associated.

It is another object of the invention to provide for a wheel structure an improved cover assembly including an outer annular part arranged for disposition over the outer side of a tire rim to conceal the same, this part being formed from a synthetic plastic sheet material and having physical properties enabling it to be self-supporting and form retaining and yet to be resiliently, locally deflectable without permanent distortion, there being provided an improved retaining arrangement for securing the annular cover member on the wheel structure.

Still another object of the invention is to provide a cover assembly of the above character for a wheel structure, such cover assembly having a radially outwardly extending part arranged to extend over the edge portion of the tire rim of the wheel to conceal the junction between the tire rim and a tire therein and to give the appearance of being a continuation of the side wall of the tire and to appear as the white side wall of a massive tire mounted on a wheel of minimum dimensions, when colored white.

Still another object of the invention is to provide an improved cover assembly which is arranged for disposition over the outer side of a wheel structure to completely conceal the same and to completely conceal the tire valve stem and yet is constructed to be locally, resiliently, temporarily flexed outwardly to render the rear side thereof accessible and to render the tire valve stem available for attachment of the nozzle of an air hose for inflation of the tire, the cover being so constructed that upon detachment of the nozzle and release of distorting pressures, it snaps back into normal configuration on the wheel.

It is still a further object of the invention to provide a wheel cover assembly which is of sufficient cross-sectional magnitude to entirely conceal the outer side of the wheel structure and yet is so constructed as to embody considerably less weight than has been experienced heretofore, thereby to reduce the unsprung weight of the vehicle with which it is associated.

It is still a further object of the invention to provide a wheel cover assembly in which at least a portion thereof is formed from synthetic sheet plastic material or the like and the remainder thereof is formed of a more rigid material, the rigid portion being utilized for detachable engagement with the wheel structure and being available to rigidify the synthetic plastic portion of the cover, the junction between the parts being so arranged that flexing of the plastic portion, to render the tire valve stem and like appurtenances available, will not impress unduly concentrated bending and breaking forces at any particular point of the synthetic plastic portion of the cover.

In accordance with the general features of the invention there is provided herein a cover assembly including an outer annular portion formed from synthetic plastic sheet material and having physical characteristics enabling it to be temporarily, locally flexed under the influence of lateral expansion of the tire with which it is associated for purposes of rendering the tire valve stem accessible, the annular cover member being associated with a central hub cap simulating portion having an axially inwardly extending peripheral skirt arranged to resiliently engage the circumferentially spaced resilient clips secured to the wheel structure with which the cover is associated, the central cover member having a radially outwardly extending intermediate rib portion arranged to conform to the configuration of the portion of the wheel with which it engages and being adapted to receive the radially inner peripheral margin of the plastic cover member which conforms to the configuration thereof and is provided with an inner peripheral margin arranged to be disposed in sandwiched relationship between the hub cap simulating member and the adjacent portion of the outer surface of the wheel structure to serve as a resilient cushion to prevent the development of vibration and rattle between the parts.

Other objects and advantages of the invention will become apparent from the following description and accompanying drawing in which:

Figure 1 is a side elevational view of a wheel structure embodying my invention;

Figure 2 is a fragmentary radial cross-sectional view of a wheel structure shown in Figure 1;

Figure 3 is an enlarged fragmentary radial cross-sectional view of the cover parts in detached association; and Figure 4 is an enlarged fragmentary radial cross-sectional view of the structure of Figure 3 showing the cover parts in assembled relationship.

It will be understood that the embodiment shown herein is for illustrative purposes only and may be changed or modified without departing from the spirit and scope of the invention as set forth in the appended claims.

As best shown in Figure 2, the wheel with which my improved cover assembly is associated includes a tire rim 10 having a base flange 11 to which an axially inwardly extending skirt 12a of the central load bearing portion 12 is secured as by riveting or welding or the like to form a unitary wheel structure. The central load bearing portion 12 is further provided with a bolt-on flange 13 which is utilized for securing the wheel structure to associated parts of a vehicle upon which the wheel is mounted.

The tire rim is further provided with opposite side wall flanges 14, opposite intermediate flanges 15 and opposite edge portions 16 between which the radially inner parts of a tire 17, having a tube 18 are adapted to be disposed. The tube 18 is provided with a valve stem 19 which is arranged to extend through a suitable aperture formed in one of the opposite side walls 14 of the tire rim.

Secured to the outer surface of the bolt-on flange 13 of the central load bearing portion 12, is a plurality of circumferentially spaced spring clip members, one of which is shown at 20 in Figure 2. Each of these spring clip members is provided with a radially inwardly extending portion 21 which is secured to the bolt-on flange 13 by means of rivets or the like as shown at 22. Each clip member is further provided with a resilient arm 23 which has an integral axially inwardly, radially outwardly extending bent back portion 24 that terminates in a finger member 25, there being provided a radially outwardly extending peak or apex 26 between the members 24 and 25 on each of the clips.

The cover assembly disclosed herein includes a radially outer annular portion 27 and a central hub cap portion 28. Preferably the annular cover member 27 is formed from a synthetic plastic sheet material and has physical characteristics enabling it to be resiliently flexed and thus temporarily distorted, yet returnable to its initial position when the distorting pressures are removed.

Preferably the cover member 27 is provided at the outer peripheral part thereof with a radially outwardly, axially outwardly, obliquely disposed portion 27a which is aligned with a portion of the side wall of a tire 17 radially outwardly of the edge portion 16 of the tire rim. Thus the junction between the tire rim and the tire is concealed and the cover 27 presents to the side wall of the tire a smooth surface which is contacted when the wheel is operated under load bearing conditions, during which the tire 17 expands laterally to a slight degree. The annular tire cover 27 is further provided with an intermediate portion 27b which presents an axially outwardly, convex surface curved to simulate the side wall of the tire and thus to appear as a continuation thereof so that if colored white it appears as the white side wall of a massive tire mounted on a wheel of minimum dimensions. The inner peripheral margin of the trim ring 27 is provided with a configuration presenting a radially inwardly extending groove 29 and a radially inwardly extending terminal flange 30 which preferably is curved to conform to the configuration of the adjacent portion of the outer surface of the central load bearing portion 12.

As indicated previously, it is desirable that the cover member 27, which is relatively flexible, be maintained upon the wheel structure in such a manner that it is rigidified and reinforced. In the present embodiment this reinforcement is provided by the central hub cap simulating cover member 28 which preferably is constructed from thin sheet metal capable of taking a high luster or an enamel finish or, if desired, from any other material which offers the strengthening qualities desired to reinforce the cover member 27.

Preferably the cover member 28 is provided at an intermediate part thereof with corrugations 31 which serve to ornament the same and also to strengthen it against distortion. The cover member 28 is further provided at an intermediate part thereof with a portion formed to present a radially outwardly extending bead 32 which is adapted to be received by the groove 29 of the cover member 27, this portion 32 terminating in a curvate portion 33 which conforms substantially to the configuration of the adjacent portion of the outer surface of the central load bearing part 12 of the wheel structure and further abuts against the portion 30 of the resilient cover member 27 to hold the portion 30 in sandwiched relationship against the wheel body. The curvate portion 33 of the cover member 28 terminates in an axially inwardly extending portion which is formed into a bead 34, this bead being adapted to engage with the clips 20 in snap-on, pry-off relationship.

It will be seen that when the cover parts are assembled as shown in Figure 2, it is merely necessary to urge the cover assembly axially inwardly so that the bead rides over the portion 24 of the respective clips 20, thus urging the same radially inwardly until the bead 34 passes the respective peaks 26 of the clip members, whereupon the clips spring radially outwardly to engage the portion 25 thereof against the bead to urge the same axially inwardly in retained relationship. With such a construction it will be seen that the intervening marginal portion 30 of the resilient cover member 27 serves admirably as a cushion to guard against the development of excessive vibration and against the development of rattle during the operation of the wheel with which the cover assembly is associated.

From Figure 3 the manner in which the cover members 27 and 28 may be associated with one another will be clearly understood. Preferably the cover member 27 is urged against the cover member 28 from the rear thereof in an axial direction whereupon the radially inwardly extending rib 27b of the cover member 27 is resiliently flexed over the bead 32 of the relatively rigid cover member 28. Thereafter the bead 32 of the member 28 comes to rest in the groove 29 of the cover member 27 to provide a securely assembled multi-cover unit.

With such a construction it will be seen that axial outward and radial inward deflection of the radially outer part of the cover member 27 will cause a flexing of the entire cross-sectional expanse thereof, there being only a proportionate amount of flexing at the respective portion of the rib 27b. Under such circumstances, it will be seen that severe bending stresses and strains will not be imposed at any concentrated point of the cover and thus fatigue will not tend to set in with the result that the life of the cover is greatly extended.

In order to remove the cover assembly of Figure 2 from the wheel structure it is merely necessary to flex the radially outer margin 27a of the cover member 27 in an axially outwardly, radially inwardly direction whereupon the point of a pry-off tool may be inserted down behind the cover member 27 and between the curvate portion 30 thereof and the adjacent surface of the wheel body. Thereafter an intermediate part of the pry-off tool may be pressed against the adjacent edge portion 16 of the tire rim, under which circumstances the point of the tool will urge the cover assembly radially outwardly to disengage the bead 34 from the respective resilient clips 20.

Another advantage of the foregoing construction is that during the aforementioned pry-off operation the cover assembly is inclined to jump from the resilient clips and fall upon the ground and thus it will be seen that when this occurs the resilient cover member 27 will merely flex and will thus protect the central, more rigid hub cap cover member 28.

From the foregoing it will be seen that there is provided herein a cover assembly and a novel retention arrangement whereby the parts of the cover are securely maintained together to provide a unitary structure and furthermore are easily associated with one another to obtain the unitary structure. There is also provided an improved cover assembly wherein the outer flexible portion may be flexed without the imposition of stresses and strains to concentrated points thereof.

What I claim is:

1. As an article of manufacture, a multi-part cover assembly including a radially outer part formed from synthetic plastic sheet material and having physical characteristics enabling it to be flexed locally resiliently, and a central relatively rigid hub cap simulating portion, said outer part having the radially inner peripheral margin thereof formed to provide a radially inwardly facing groove and a radially inwardly extending peripheral flange, said hub cap simulating portion having an intermediate part thereof formed to provide a radially outwardly extending circular bead for disposition in nested relationship with the groove of said outer cover part and having a portion of the surface thereof arranged to receive said marginal flange of said first named part.

2. In a wheel structure having a flanged tire rim and a central load bearing portion provided at the radial inner extremity thereof with a bolt-on flange, there being retaining means disposed on the outer side of said bolt-on flange, a cover assembly including a radially outer, annular, locally resiliently flexible cover member and a central, relatively rigid hub cap simulating cover member, said annular member being provided at the radially inner part thereof with a radially inwardly extending groove and a radially inwardly extending rib and having the radially inner margin thereof formed to provide a flange, said central hub cap simulating member having a substantially axially inwardly extending retaining flange and a radially outwardly extending circular rib between the central portion thereof and said flange, said rib being arranged for nested retaining engagement in said groove of the annular cover member and the flange of said annular cover member being arranged to overlie the adjacent portion of the surface of said hub cap simulating member, said last named member being engageable with the wheel structure by detachable engagement of the axially inwardly extending flange thereof with said retaining means on said bolt-on flange whereby the radially outwardly extending beaded part thereof is urged toward the adjacent portion of the outer surface of said central load bearing portion with said flange of the annular cover member sandwiched therebetween to provide a cushion between the parts.

3. As an article of manufacture, a multi-part cover assembly including a radially outer annular portion formed from sheet synthetic plastic material and having characteristics enabling it to be form retaining and self-supporting and yet resiliently flexible and a central circular hub cap simulating portion, said outer annular portion having the radially inner margin thereof formed to provide a radially inwardly extending circular rib and a radially inwardly facing circular groove disposed axially inwardly of said rib and said circular cover member having an intermediate portion thereof formed to provide a radially outwardly extending circular rib arranged for nested relationship in said radially facing groove of said first named cover member and being provided with a marginal portion formed with a radially inwardly and then generally axially inwardly extending flange arranged for detachable engagement with a portion of a wheel structure over which the cover assembly is disposed, said annular cover member being further provided at the radially inner edge thereof with a flange adapted to overlie the axially inner surface of said radially inwardly extending portion of the hub cap simulating cover member thereby to be disposed in sandwiched relationship between the hub cap cover member and the adjacent portion of the outer surface of a wheel structure over which the cover assembly is disposed when said retaining portion of the hub cap member is retained upon the wheel.

GEORGE ALBERT LYON.